United States Patent [19]

Taylor

[11] 4,207,512
[45] Jun. 10, 1980

[54] BATTERY CHARGING SYSTEMS FOR ROAD VEHICLES

[75] Inventor: Joseph D. F. Taylor, Kidderminister, England

[73] Assignee: Lucas Industries Limited, Birmingham, England

[21] Appl. No.: 888,610

[22] Filed: Mar. 21, 1978

[30] Foreign Application Priority Data

Apr. 2, 1977 [GB] United Kingdom ............... 14015/77

[51] Int. Cl.² ............................................. H02J 7/14
[52] U.S. Cl. ........................................ 320/17; 307/16; 320/40; 322/28
[58] Field of Search ................... 320/6, 15, 17, 39, 40, 320/59; 322/28; 307/16

[56] References Cited

U.S. PATENT DOCUMENTS

| | | | |
|---|---|---|---|
| 3,671,843 | 6/1972 | Huntzinger et al. | 320/40 X |
| 3,677,025 | 5/1972 | Campbell et al. | 320/40 X |
| 3,900,784 | 8/1975 | Seike | 320/39 X |

Primary Examiner—Robert J. Hickey
Attorney, Agent, or Firm—Ladas, Parry, Von Gehr, Goldsmith & Deschamps

[57] ABSTRACT

A road vehicle battery charging system for a dual voltage electrical supply includes a conventional alternator/rectifier assembly for charging a main battery and a d.c. to d.c. converter for charging an auxiliary battery in series with the main battery. The converter includes two transistors connected with a feedback transformer to form an oscillator to drive an output transformer. The oscillator includes two diodes which need to be connected to one terminal of the main battery to allow the oscillator to run and a switching transistor is interposed in such connection and has its conduction controlled in accordance with the alternator output so as to inhibit the d.c. to d.c. converter when the alternator output is below a predetermined level.

4 Claims, 1 Drawing Figure

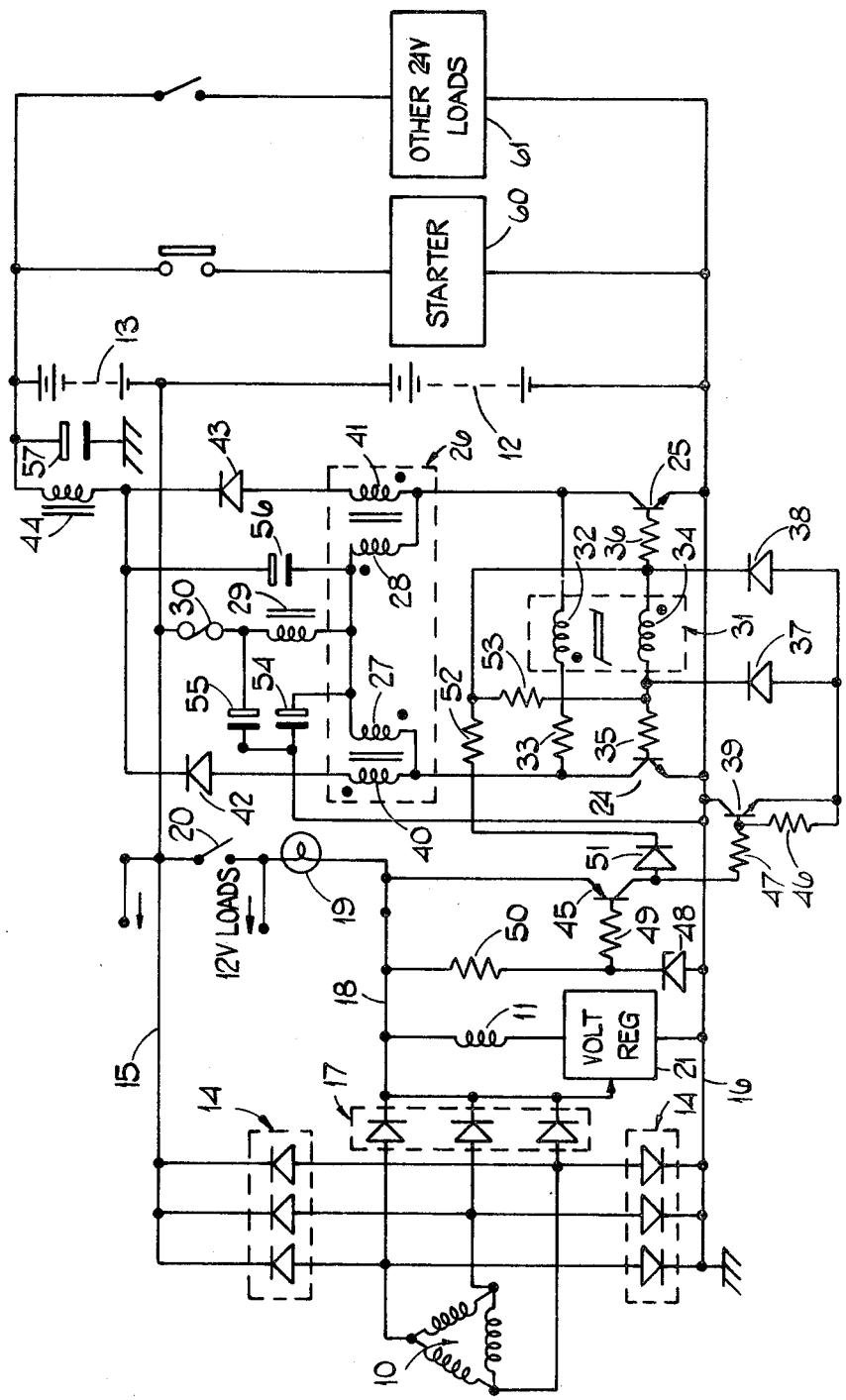

BATTERY CHARGING SYSTEMS FOR ROAD VEHICLES

This invention relates to battery charging systems for road vehicles.

Vehicle electrical systems have already been proposed in which there are main and auxiliary batteries, one of which is used for normal vehicle loads, e.g., lighting and ignition, and the other of which is used in series with the first mentioned battery to provide a higher voltage supply for engine starting and other purposes.

When a d.c. to d.c. converter is used for charging the auxiliary battery, as distinct from using an arrangement involving using the a.c. output of an alternator forming part of the system, it has been found to be desirable to ensure that the main battery does not discharge into the auxiliary battery. Use of the ignition switch for this purpose is not satisfactory since there may well be occasions when the ignition is switched on but no output is being produced by the alternator.

It is accordingly an object of the invention to provide an arrangement for switching off the d.c. to d.c. converter in a battery charging system of the general type referred to above.

A battery charging system in accordance with the invention comprises an alternator, a main rectifier connecting the alternator to a main battery an auxiliary rectifier providing an output voltage which is the same as that provided by the main rectifier when the alternator is running normally, a d.c. to d.c. converter connecting the main battery to an auxiliary battery in series with the main battery, and semi-conductor switch means for inhibiting operation of the d.c. to d.c. converter sensitive to the output voltage of the auxiliary rectifier and arranged to inhibit operation of said converter when such output voltage is below a predetermined level.

An example of the invention is shown in the accompanying drawing which is the circuit diagram of the battery charging system.

As shown in the drawing an alternator having a stator winding 10 and a rotatable field winding 11 is used for charging both a main battery 12 and an auxiliary battery 13. A main rectifier 14 connects the alternator output to a main supply rail 15 and an earth return 16 across which the main battery 12 is connected. An auxiliary rectifier 17 connects the output of the alternator to another rail 18, connected via an ignition warning lamp 19 and an ignition switch 20 to the rail 15. When the alternator is running normally the rail 18 is at the same voltage as the rail 15 so that the lamp 19 is extinguished in known manner. The field winding 11 is connected in series with a voltage regulator 21 in known manner between the rail 18 and the earth return 16.

For charging the auxiliary battery 13 there is provided a d.c. to d.c. converter including two semi-conductor switching elements in the form of npn transistors 24, 25. Each such transistor has its emitter connected to the earth return 16. An autotransformer 26 has two main windings 27, 28 having equal numbers of turns, and one end of each such main winding is connected to the collector of an associated one of the transistors 24, 25. The other ends of the main windings 27, 28 are connected together and, via a choked 29 and a fuse 30 in series, to the rail 15.

The transistors 24, 25 form part of an oscillator in which feedback is provided by a saturable core transformer 31. The primary winding 32 of this transformer 31 is connected in series with a resistor 33 between the collectors of the transistors 24, 25 and the two ends of the secondary winding 34 of the transformer 31 are connected by resistors 35, 36 to the bases of the transistors 24, 25 respectively. The ends of the secondary winding 34 are also connected to the cathodes of a pair of diodes 37, 38 which have their anodes connected to the emitter of an npn transistor 39 having its collector connected to the earth return 16.

Assuming for the moment that the transistor 39 is conductive and the oscillator is running when the transistor 24 is turning on current flows through the winding 27 inducing a voltage at the collector of the transistor 25 which is higher than the voltage on the rail 15. Current thus flows through the primary winding 32 of the transformer 31 inducing a voltage in the secondary winding 33 causing current to flow through the resistor 35, the base-emitter of the transistor 24, the collector emitter of the transistor 39 and the diode 38. This current acts to turn the transistor 24 on harder. When the transformer 31 saturates feedback ceases, transistor 24 starts to turn off, so that the current flowing in the primary of the transformer 32 reverses and transistor 25 starts turning on. The collector of the transistor 24 then assumes the higher voltage.

Because of the effect of losses in the fuse 30, the inductor 29, the autotransformer 26 and the transistors 24 and 25, the peak-to-peak voltage at the collectors of the transistors 24, 25 is in fact somewhat less than twice the voltage between the rails 15 and the earth return 16. To make up this deficiency further windings 40, 41 of the auto-transformer 26 are each connected at one end to the collector of the associated transistor 24 or 25 and the other ends of these further windings 40, 41 are connected to the anodes of two diodes 42, 43 with their cathodes connected together and via a further choke 44 to the positive terminal of the battery 13. In a typical application the main windings 27, 28 may each have 17 turns whilst the further windings 40, 41 have only two turns each.

The transistor 39 is used for stopping oscillation of the d.c. to d.c. converter by interrupting the current paths for the feedback current from the transformer 31. The transistor 39 is controlled by a pnp transistor 45, its base being connected by a resistor 46 to its own emitter and by a resistor 47 to the collector of the transistor 45. The base of the transistor 45 is connected by a resistor 49 to the cathode of a zener diode 48 which has its anode connected to the earth return 16. The cathode of the zener diode 48 is also connected by a resistor 50 to the rail 18, to which the emitter of the transistor 45 is also connected. The transistor 45 conducts only when the voltage on the rail 18 is sufficiently high to break down the zener diode 18. When transistor 45 is conductive, transistor 39 can turn on to conduct the feedback current as hereinbefore described. When the voltage on rail 18 is too low to break down the zener diode 48, the transistor 45 is off and transistor 39 cannot conduct thereby interrupting the feedback current and preventing the oscillator from running.

The collector of the transistor 45 is also connected to the anode of a diode 51 which has its cathode connected by a resistor 52 to the end of the secondary winding 34 which is connected to the resistor 36. A resistor 53 interconnects the ends of the secondary winding 34.

These two resistors 52, 53 ensure that the oscillator starts running whenever the transistor 45 turns on, by ensuring that transistor 25 is more heavily biased than transistor 24.

The chokes 29, 44 form part of two filter circuits which prevent the oscillating signals generated within the d.c. to d.c. converter from being superimposed on battery voltages. To this end the choke 29 is associated with two capacitors 54, 55 connecting its two ends to the earth return 16. The choke 44 is associated with a capacitor 56 connected between one end of the choke 44 and the interconnection of the main windings 27, 28 and with a capacitor 57 connected between the other end of the choke 44 and the earth return 16.

As is usual there are connections from the battery 12 and from the ignition switch 20 for 12 V loads which are respectively independent of and dependent on the ignition switch (e.g. the ignition and the lighting respectively).

The battery 13 is used mainly for starting and the drawing shows the starter circuit 60 connected across the series combination of the two batteries 12, 13. In addition, other loads, such as a trailer lighting system may be connected across the series combination of the two batteries 12, 13.

Where there is to be a high current demand on the auxiliary battery 13 it may be economically preferable to use two or more d.c. to d.c. converters operating in parallel to charge the battery 13, rather than attempting to increase the current rating of the converter. In this case the switching circuit consisting of the zener diode 48, the transistors 39 and 45, the diode 51, and the resistors 46, 47, 49 and 50 need not be duplicated but can be common to both (or all) the d.c. to d.c. converters.

I claim:

1. A battery charging system for a road vehicle comprising an alternator, a main rectifier connecting the alternator to a main battery, a d.c. to d.c. converter connecting the main battery to an auxiliary battery in series with the main battery, and semi-conductor switch means for inhibiting operation of the d.c. to d.c. converter sensitive to the output voltage of the alternator and arranged to inhibit operation of said converter when such output voltage is below a predetermined level, said converter including a pair of transistors having their emitters connected to one terminal of the main battery and their collectors connected through output transformers windings to the other terminal of the main battery, a feedback transformer having a primary winding connected between the collectors of said transistors and a secondary winding connected between the bases of said transistors to provide regenerative a.c. feedback to the transistors, and a pair of diodes through which opposite ends of the secondary winding are connected to said one terminal of the main battery, said semi-conductor switch means controlling the connection of said diodes to said one terminal of the main battery.

2. A battery charging system as claimed in claim 1 in which an auxiliary rectifier provides an output voltage which is the same as that provided by the main rectifier when the alternator is running normally, and in which said semi-conductor switch means comprises a switching transistor having its collector-emitter path in series with said diodes, a resistor connecting the base and emitter of said switching transistor and means for turning on said switching transistor when the output voltage of the auxiliary rectifier is above said predetermined level of the alternator output voltage.

3. A battery charging system as claimed in claim 2 in which said means for turning on the switching transistor comprises a further transistor having its emitter connected to the output of the auxiliary rectifier, and its collector connected to the base of the switching transistor and voltage sensitive means connecting the base of said further transistor to the output of the auxiliary rectifier.

4. A battery charging system as claimed in claim 1 in which there are a plurality of said d.c. to d.c. converters connected in parallel and a common semi-conductor switch means for inhibiting all of said converters.

* * * * *